(12) United States Patent
Mowill

(10) Patent No.: US 7,628,018 B2
(45) Date of Patent: Dec. 8, 2009

(54) SINGLE STAGE DUAL-ENTRY CENTRIAFUGAL COMPRESSOR, RADIAL TURBINE GAS GENERATOR

(76) Inventor: R. Jan Mowill, Rabatstraat 67, 7559 CX Hengelo (NL)

(*) Notice: Subject to any disclaimer, the term of this patent is extended or adjusted under 35 U.S.C. 154(b) by 245 days.

(21) Appl. No.: 12/073,980

(22) Filed: Mar. 12, 2008

(65) Prior Publication Data
US 2009/0232676 A1 Sep. 17, 2009

(51) Int. Cl.
*F02C 1/00* (2006.01)
*F02G 3/00* (2006.01)
(52) U.S. Cl. .......................... 60/726; 415/102; 415/144
(58) Field of Classification Search .................. 60/726, 60/782, 785; 415/102, 144
See application file for complete search history.

(56) References Cited

U.S. PATENT DOCUMENTS

| 3,966,362 | A | * | 6/1976 | Linhardt | 417/374 |
| 4,530,639 | A | * | 7/1985 | Mowill | 415/98 |
| 4,641,495 | A | | 2/1987 | Mowill | |
| 4,704,861 | A | | 11/1987 | Mowill | |
| 5,664,413 | A | * | 9/1997 | Kington et al. | 60/799 |
| 7,434,400 | B2 | * | 10/2008 | Lawlor et al. | 60/726 |
| 2004/0211165 | A1 | * | 10/2004 | Hosokawa et al. | 60/39.23 |

OTHER PUBLICATIONS

Kongsberg "Viking 5 Gas Turbine" brochure, 3 pages.
Kongsberg "3000-4000 kVA Generating Set" brochure, 8 pages.
Ulstein "Ulstein High Speed Concept/Eurodyn Gas Turbine" brochure, 4 pages.
ASME 57-A-258 "Compressor Development for Small Gas Trubines", 23 pages.
AiResearch GT-85 publication, 2 pages.
Thomassen Holland b.v., 3 pages.

* cited by examiner

*Primary Examiner*—William H Rodriguez
(74) *Attorney, Agent, or Firm*—Finnegan, Henderson, Farabow, Garrett & Dunner LLP

(57) ABSTRACT

A compact, single shaft gas turbine gas generator uses a high pressure ratio dual-entry single stage centrifugal compressor, can combustors, and a radial inflow turbine with the compressor configured to achieve an overall pressure ratio of about 12:1 or greater and Mach Numbers less than or equal to about 1.4. The radial inflow turbine is configured to provide an expansion ratio of about 4:1 to about 5:1, to provide partially expanded combustion gases to a free-power turbine or an expansion nozzle, in a work-producing engine configuration. A ball bearing assembly in front of the compressor is used in conjunction with a thrust piston assembly to take up turbine thrust load, while a radial tilt pad bearing assembly is used in front of the turbine. A collector with scroll-shaped sector portions collects compressed air from an annular vaned diffuser, and respective crossover ducts channel the collected diffused compressed air from each sector portion to a plenum feeding can combustors. Bleed systems at each compressor inlet provide increased diffuser stability margins. Gas turbine engines configured with the above gas generator may provide 30% thermal efficiency or more in a rated power range of about 4 Mw or less.

20 Claims, 6 Drawing Sheets

SINGLE STAGE DUAL-ENTRY CENTRIAFUGAL COMPRESSOR, RADIAL TURBINE GAS GENERATOR

BACKGROUND

1. Field of the Invention

This invention relates to gas turbine gas generators, and more particularly to structurally compact, high performance gas turbine gas generators using centrifugal compressors and radial inflow turbines. This invention also relates to gas turbine engines using such gas generators.

2. Description of the Prior Art

There is a continuing need for gas turbine power plants as alternatives for diesel engines, for instance, for vehicular and other applications where a compact, lightweight engine is required. Practical experience has shown that substantial space and weight savings are available using conventional gas turbines. However, existing gas turbine engines in the small/medium power range, e.g. about 4 megawatts ("Mw") or less, typically have thermal efficiencies less than 30%. Heretofore, efficiencies of 30% or greater were only available for axial compressor-axial turbine type engines above about 4 Mw because of the lower relative losses of the larger engines.

Also, while radial-type gas turbine engines having inflow turbines are known, multiple compressor stages are usually required to achieve acceptable thermal efficiencies. However, the relative complexity and other limitations of using multiple compressor stages in existing simple cycle engines continues to be a major drawback in prior art devices, particularly in the small/medium power range, where simplicity is most important.

For example, a known gas turbine auxiliary power unit (APU) includes a double-entry (often referred to as a "dual-entry"), centrifugal compressor first stage and a single-entry centrifugal compressor second stage operating in series to provide compressed air both for combustion with fuel in a combustor and bleed air for external use. The hot gases from the combustor are fed to a single stage radial inflow turbine that drives both compressors and, in addition, provides shaft power for external use in a manner consistent with a single shaft engine.

Also, in previous patents (U.S. Pat. No. 4,641,495 and U.S. Pat. No. 4,704,861), the present inventor disclosed fuel-efficient, simple cycle gas turbine gas generators using a dual-entry first stage centrifugal compressor and a single-entry second stage centrifugal compressor together with a radial inflow turbine in a single shaft configuration. In these gas generators, a total of three rotor components as well as three bearing assemblies are used to mount the shaft assembly to the gas generator housing, with one of the bearing assemblies being positioned in the turbine section. Problems with the increased complexity of such an arrangement are compounded by the higher cost and potentially higher failure rate for the bearing assembly in the turbine section.

SUMMARY OF THE INVENTION

The present invention constitutes an advanced aerodynamic and structural solution to efficiently accomplish in one stage, performance that would otherwise require multiple compressor stages, higher losses, and costlier, less-compact configurations. Moreover, radial compressor-turbine configurations according to the current invention are able to demonstrate at least 30% efficiency in a power range substantially lower (about one third) of the larger, axial turbines. The aerodynamic design of the gas generator with a double entry, high pressure ratio centrifugal compressor coupled to an uncooled radial turbine will have lower losses than configurations using axial rotor components. Radial gas generators and engines according to the present disclosure thus have a performance "window" below the optimum operating advantage of axial component machines.

In one aspect, the gas turbine gas generator disclosed herein includes a rotatable shaft defining an axial direction and a radial direction, a single compressor stage comprising a high pressure ratio dual-entry centrifugal compressor having a housing and a bladed impeller mounted on the shaft and defining with the housing a pair of opposed axially directed inlets and a single radially directed outlet, and a combustor operatively connected to receive compressed air from the centrifugal compressor outlet and configured for combusting fuel with the compressed air to produce high velocity combustion gases. The gas generator also includes a radial inflow turbine mounted on the shaft and operatively connected to receive combustion gases from the combustor through a radially directed inlet and configured to partially expand the received combustion gases to drive the centrifugal compressor. The radial inflow turbine also is configured to direct the partially expanded combustion gases through a generally axially directed turbine outlet. The shaft is rotatably supported by a pair of bearing assemblies positioned at opposed axial ends of the centrifugal compressor, and the radial inflow turbine is mounted on a cantilevered portion of the shaft extending axially outboard of one of the bearing assemblies. The centrifugal compressor inlets are configured to provide, at a rated mass flow and speed, a maximum compressor inlet Mach Number of about 1.4 or less, and the dual-entry centrifugal compressor is configured to provide at the rated speed and mass flow, a pressure ratio of about 12:1 or greater.

In another aspect, the disclosed gas generator is an improved gas turbine gas generator of the type having a single stage, single entry centrifugal compressor mounted on a shaft rotatable about an axis, the compressor supplying compressed air to a combustor section, and a radial inflow turbine mounted on the shaft and configured for partially expanding gases formed by combusting fuel with the compressed air in the combustor section, for driving the compressor and for releasing the partially expanded combustion gases for further work-producing expansion. The improvement includes the single stage centrifugal compressor comprising a single dual-entry high pressure ratio centrifugal compressor having a housing and a bladed impeller mounted on the shaft within the housing, the impeller defining with the housing a pair of spaced apart axially directed opposed inlets and a single radially directed outlet. The dual-entry centrifugal compressor is configured to have a maximum inducer blade Mach Number of less than or equal to about 1.4 at rated speed and mass flow, and the compressor is also configured to provide a pressure ratio of about 12:1 or greater at the compressor diffuser outlet. Further, the compressor includes means for bleeding air from each of the inlets.

Hence, for a given mass flow and speed (RPM), the dual-entry compressor can be configured in accordance with the present invention, to handle the flow within acceptable Mach Numbers and losses. The requirement of a 12:1 pressure ratio would be very difficult to achieve with conventional single-entry centrifugal compressors while maintaining a close clearance between the impeller and the housing. Configuring the dual-entry compressor to be symmetrical substantially avoids shape distortion at high RPM's, the so-called "flowering" effect, with consequent probability of rubbing.

The accompanying drawings which are incorporated in and constitute a part of this specification, illustrate embodiments of the disclosed gas turbine gas generator and, together with the description, serve to explain the principles of the gas turbine gas generator.

Figure 1A:
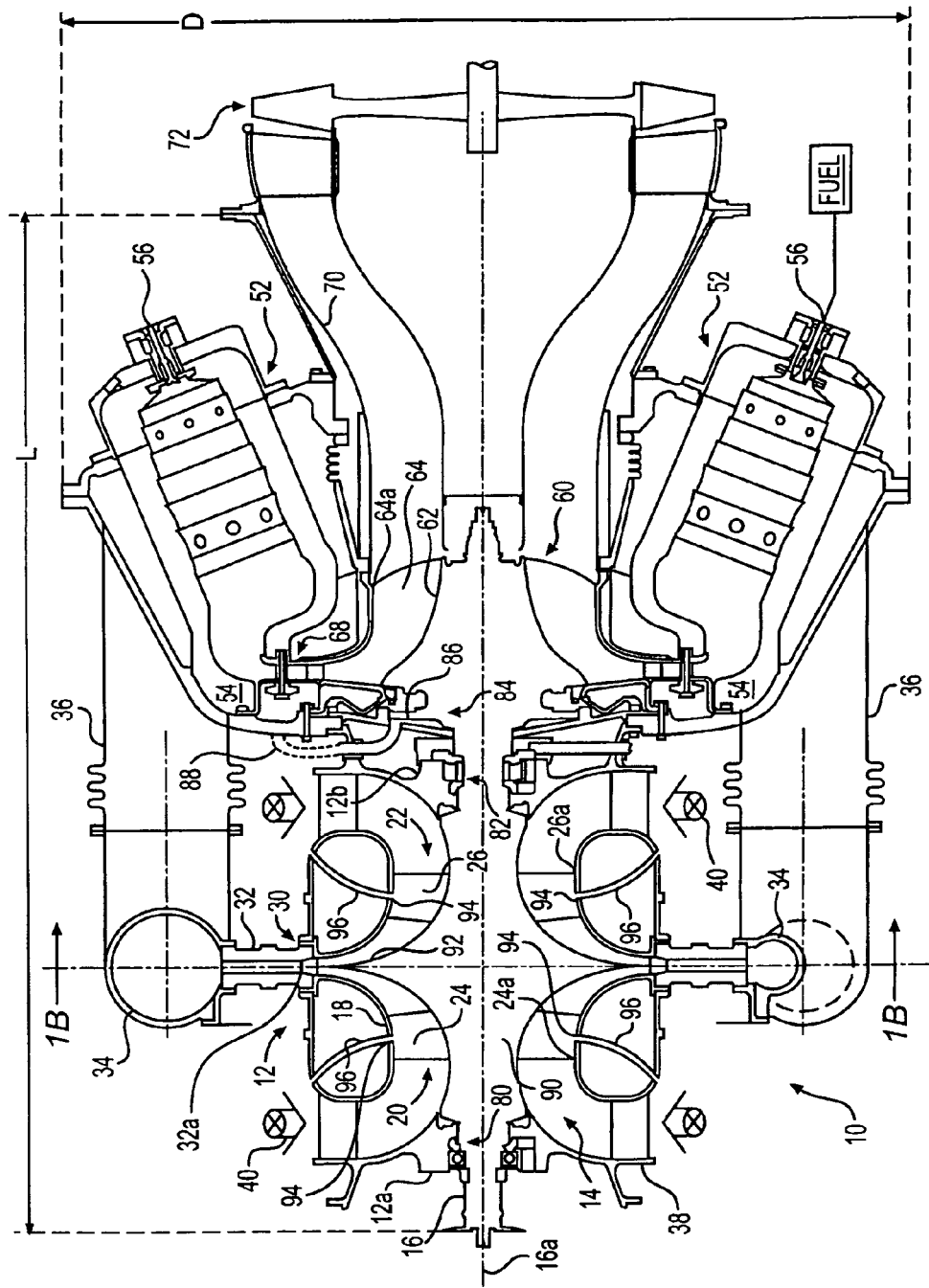
FIG. 1A is a schematic cross-sectional top view of a compact gas turbine gas generator in accordance with the present disclosure, in use with a free-power turbine module.

It is to be understood that both the foregoing general description and the following detailed description are exemplary and explanatory only and are not restrictive of the scope of the invention as claimed.

The accompanying drawings, which are incorporated in and constitute a part of this specification, illustrate several embodiments of the invention and together with the description serve to explain the principles of the invention.

DESCRIPTION OF THE DISCLOSED EMBODIMENTS

In accordance with an aspect of the present disclosure, the gas turbine gas generator includes a rotatable shaft defining an axial direction and a radial direction, and a single compressor stage having a dual-entry centrifugal compressor mounted on the shaft and having a housing and a bladed impeller. The impeller defines with the housing a pair of axially directed inlets and a single radially directed outlet. As embodied herein and depicted in FIG. 1A, gas turbine gas generator designated generally by 10 includes dual-entry high pressure ratio compressor module 12 having impeller 14 mounted for rotation with shaft assembly 16 about axis 16a. Dual-entry compressor 12 also includes housing 18 which together with impeller 14 define a pair of flow-symmetric, axially opposed inlets 20, 22 for directing air to compressor blade assemblies 24, 26 of impeller 14. Dual-entry compressor 12 has a single, annular, radially directed compressor outlet 30 operatively connected to annular diffuser assembly 32 which is a vane-type diffusers. See FIG. 1B. However, a pipe-type diffuser also could be used. Diffuser assembly 32 receives the high velocity air from outlet 30 and converts the high velocity air to higher pressure, lower velocity air, which is channeled to combustor assembly 50, as will be discussed below.

Figure 1B:
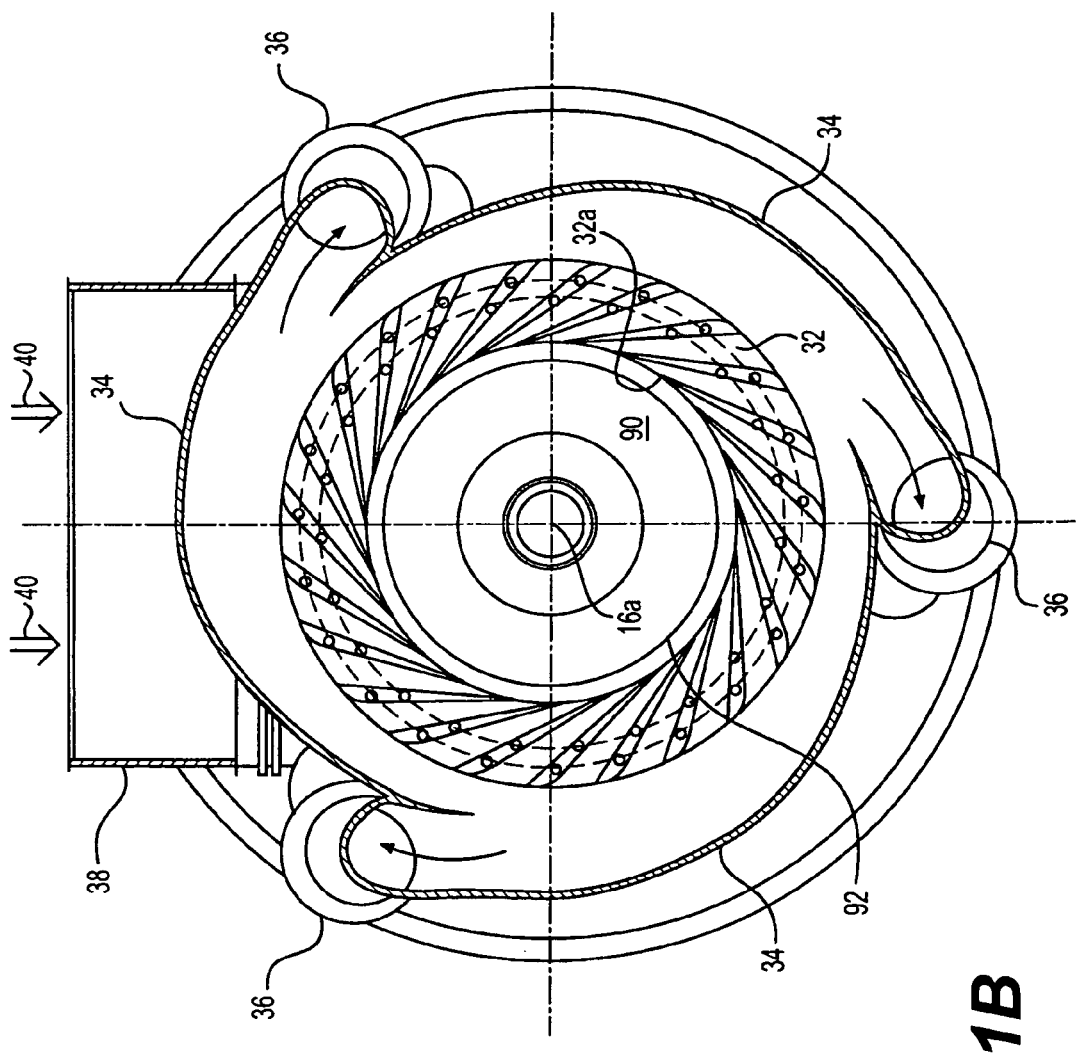
FIG. 1B is a schematic cross-sectional end view of the gas turbine gas generator of FIG. 1A depicting the orientation of the collector with three scroll-shaped sectors and three crossover ducts.

With continued reference to FIGS. 1A and 1B, diffuser assembly 32 is provided with collector 34 having three scroll-shaped sector portions for collecting the diffused air. Each scroll-shaped sector portion of collector 34 extends approximately 120° about 16a and has a diverging flow area in the circumferential direction, which flow area increases towards a respective crossover duct 36. While collector 34 is depicted as being circumferentially continuous with flow between adjacent sectors permitted to mitigate flow unbalance, it may alternatively be constructed from separate sector portions providing little or no flow communication between adjacent sectors, if an even flow distribution can be otherwise achieved.

Figure 1C:
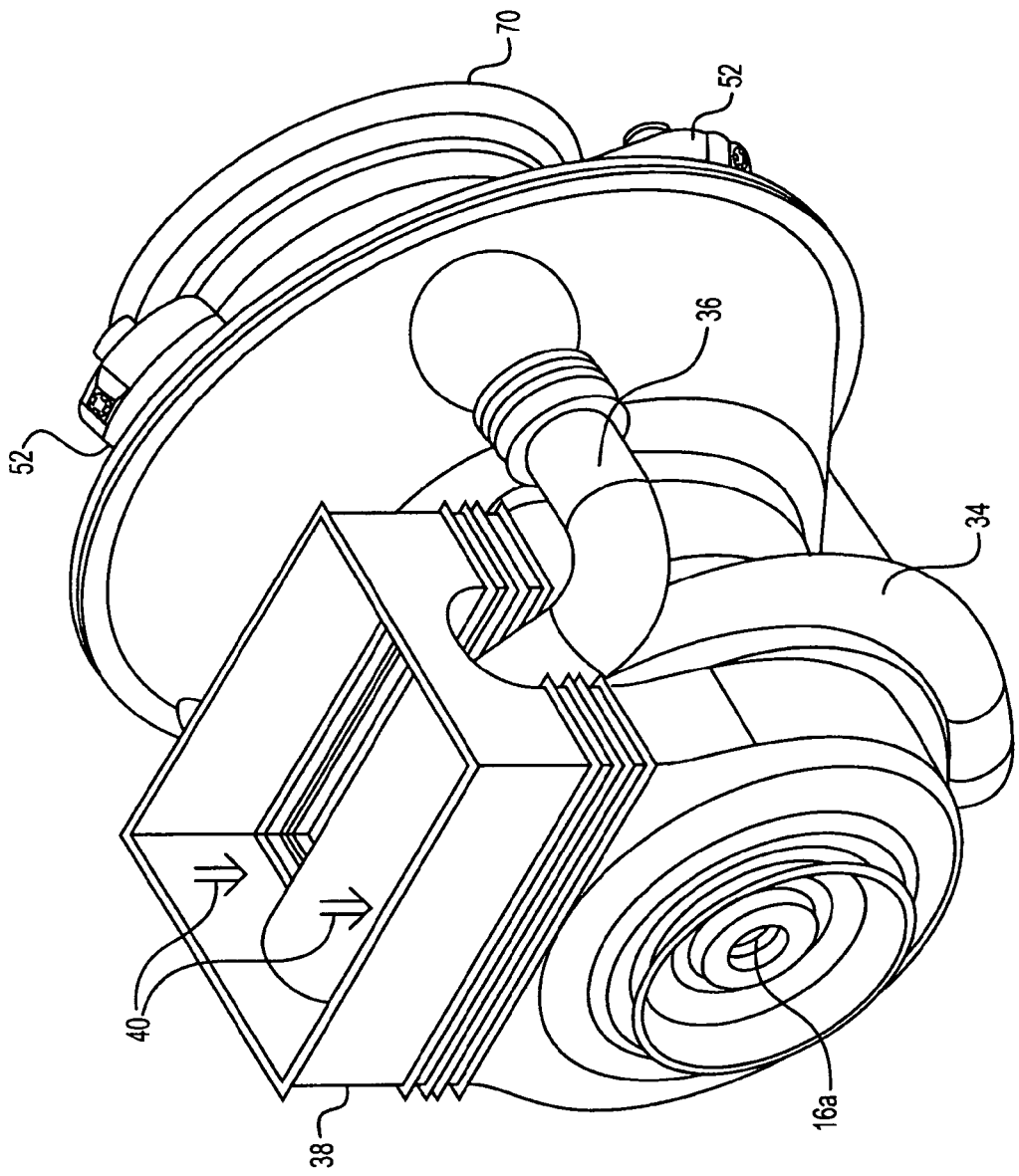
FIG. 1C is perspective view of the gas turbine gas generator of FIG. 1A.

For the embodiment shown in FIG. 1A, each sector portion of collector 34 is flow-connected to combustor assembly 50 by a respective one of three crossover ducts 36. Crossover ducts 36 are generally cylindrical and directed generally in the axial direction. In the depicted embodiment, three crossover ducts 36 (only two being shown in FIG. 1A) are angularly spaced about axis 16a, and one of the ducts can be at a bottom dead center position, relative to the ground, as depicted in FIG. 1B. Advantageously in such an arrangement, compressor inlet casing 38 can be configured such that inlet air can be channeled to compressor 12 vertically downward past the adjacent crossover ducts 36 (depicted in FIGS. 1A-1C by arrows labeled 40), thereby simplifying inlet air management and providing generally the same inlet air flow conditions for both compressor inlets 20, 22. However, a fewer or greater number of collector scroll-shaped sector portions and crossover ducts can be used, and the angular arrangement can vary from the approximately 120° spacing depicted in FIG. 1B.

Further in accordance with the present disclosure, the gas turbine gas generator includes a combustor assembly operatively connected to receive compressed air from the centrifugal compressor outlet and configured for combusting fuel with the compressed air to produce combustion gases. As embodied herein, combustor assembly 50 includes three can-type combustors 52 angularly spaced about axis 16a and a combustor inlet manifold 54 operatively connected to crossover ducts 36, to receive and distribute the compressed air to the individual can combustors 52. While any number of combustors can be used, it may be preferred to use the same number of can combustors as there are crossover ducts (three in this case) to provide symmetric flow conditions at the combustors. The can combustors 52 may be axially inclined and angularly disposed between the crossover ducts 36 to provide more efficient packaging. It may also be preferred that, during steady state operation, all the compressed air exiting compressor 12, except that used for cooling or sealing purposes, is channeled to can combustors 52 via crossover ducts 36 and inlet manifold 54. Fuel can be supplied to can combustors 52 via injectors or nozzles 56, as is conventional.

Can combustors such as disclosed in co-pending application Ser. No. 11/984,055 filed Nov. 13, 2007 and Ser. No. 12/003,829 filed Jan. 2, 2008, the disclosures of which are hereby incorporated by reference, can be used, as well as other can combustor configurations. Also, annular combustors with multiple fuel injectors may be used.

Still further in accordance with an aspect of the present disclosure, the gas generator includes a single stage radial turbine having a radially directed inlet and generally axially directed outlet. The radial turbine is operatively connected to directly drive the shaft assembly on which the compressor is mounted. The turbine is also flow connected to the combustor assembly for receiving, and partially expanding, the combustion gases. As embodied herein, and as best seen in FIG. 1A, gas generator 10 includes radial inflow turbine 60 with turbine rotor 62 having blades 64 and an exducer section 64a. Turbine rotor 62 is directly coupled to shaft assembly 16 to rotate impeller 14 of dual-entry compressor 12. Turbine 60 receives the hot combustion gases from combustor assembly 50 through turbine inlet nozzle assembly 68, partially expands the combustion gases, and then exhausts the partially expanded gases at the exducer section 64a. The expansion ratio of turbine 60 may be about 4:1 to about 5:1.

Figure 1D:
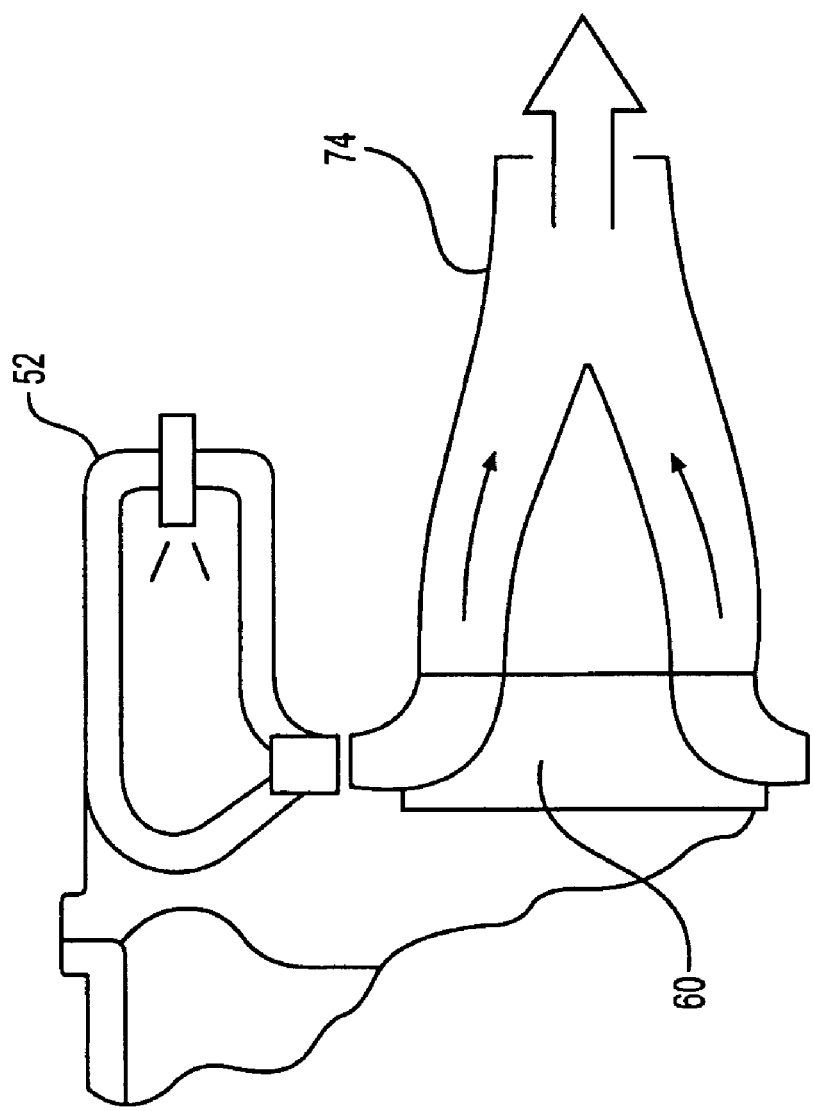
FIG. 1D is a schematic of a propulsion nozzle apparatus for use with the gas turbine gas generator of FIG. 1A, in place of the free-power turbine module.

Still further, the gas generator may include an exhaust duct flow-connected to the turbine outlet for ducting the partially expanded combustion gases for further external work-producing expansion. As depicted in FIG. 1A, gas generator 10 includes exhaust duct 70 operatively connected to receive the partially expanded combustion gases from turbine 60 for ducting, e.g. to downstream free-power turbine module 72 or jet propulsion nozzle apparatus 74 (FIG. 1D), to provide further work-producing expansion of the combustion gases. Free power-turbine module 72 can have one or more stages (only one stage being shown in FIG. 1A).

Further in accordance with an aspect of the present disclosure, the shaft is rotatably supported by a pair of bearings assemblies positioned at opposed axial ends of the dual-entry centrifugal compressor, and the radial inflow turbine is mounted on a cantilevered portion of the shaft axially outboard of one of the bearing assemblies. As embodied herein and depicted in FIG. 1A, shaft 16 is supported for rotation in gas generator 10 by bearing assemblies 80, 82 positioned proximate ends 12a and 12b, respectively, of compressor 12. It may be preferred that bearing assembly 80 include a ball bearing, and that the bearing assembly 82, proximate turbine 66, include a radial tilt pad bearing.

It also may be preferred that gas generator 10 includes thrust piston assembly 84, including thrust piston 86, which can be an disc shaped member connected to turbine rotor 62, and conduit 88 for providing pressurized air, e.g. from combustor inlet manifold 54, as schematically depicted in FIG. 1A. Although one or more ball bearings, such as in bearing assembly 80, can be configured to take up thrust loads in the axial direction from the turbine, a radial tilt pad bearing, such as in bearing assembly 82, can withstand only radial loads. Thrust piston assembly 84 therefore is provided to help counteract the axial thrust on shaft 16 from turbine 60 during operation. As depicted in FIG. 1A, turbine 60 is configured to be cantilever-mounted on the over-hanging portion of shaft 16 axially outboard of bearing assembly 82, such that essentially all the generated axial thrust must taken up by bearing assembly 80 and thrust piston assembly 84, with about 50% being taken up by the thrust piston. One skilled in the art would appreciate that other bearing and/or thrust piston configurations could be used, given the present disclosure.

Figure 2A:
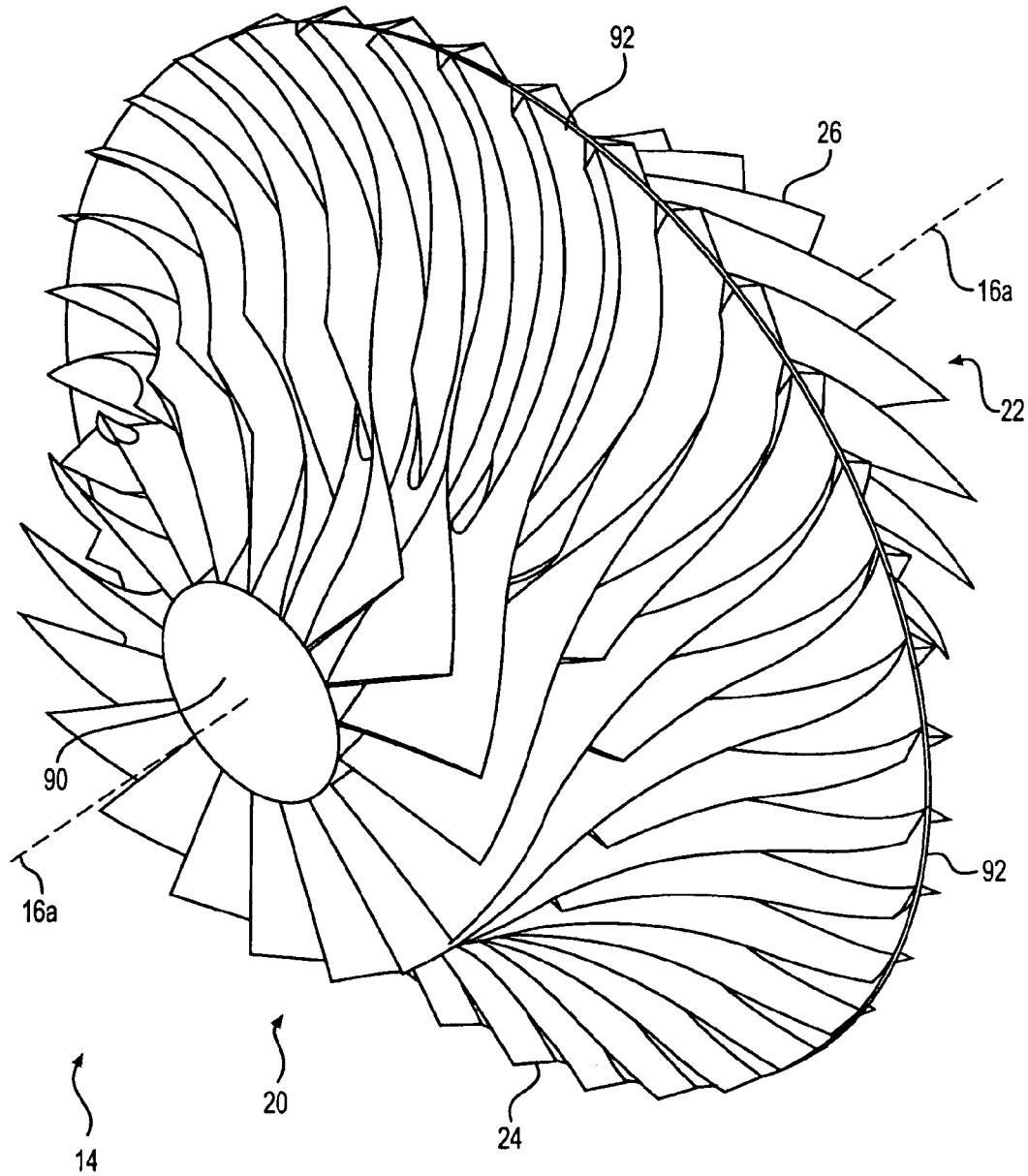
FIGS. 2A and 2B are a schematic perspective view and side view, respectively, of the dual-entry high pressure ratio centrifugal compressor impeller component of FIG. 1A.
Figure 2B:
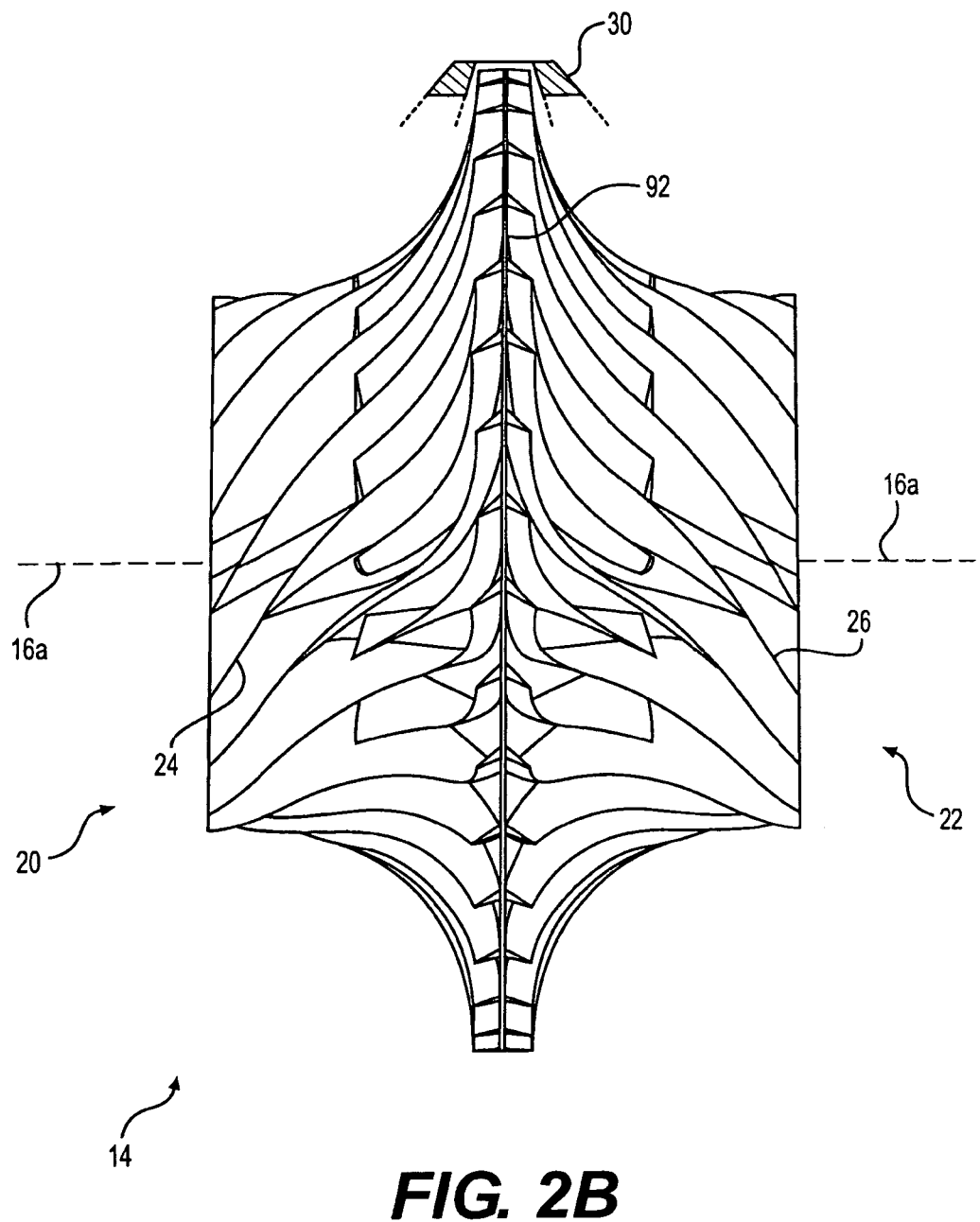

Still further in accordance with one or more aspects of the present disclosure, the centrifugal compressor inlets are configured to provide, at rated air mass flow and speed (RPM), a maximum compressor inlet Mach Number of about 1.4 or less, and the dual-entry high pressure ratio centrifugal compressor is further configured to provide at the rated speed and mass flow a pressure ratio of about 12:1 or greater at the diffuser exit. As embodied herein, and with reference now to FIGS. 2A and 2B, impeller 14 of dual-entry centrifugal compressor 12 may preferably be configured to have symmetric blade sets 24 and 26 on opposing axial sides of symmetric impeller hub 90. Blade sets 24, 26 extend along hub 90 from respective inlets 20, 22 toward compressor outlet 30, and terminate at outlet 30 on opposite sides of a common, radially extending hub wall portion 92. Note that the running clearance between the compressor blades and outlet 30 in FIG. 2B has been exaggerated, for clarity. As stated above, compressor 12, including impeller 14, is specifically configured to provide inlet Mach Numbers of about 1.4 or less and a pressure ratio of about 12:1 or greater, and even to about 15:1 at rated speed and mass flow.

Still further, the dual-entry compressor includes means for bleeding compressor air from each of the compressor inlets. Because of the relatively high pressure ratio at which the compressor may operate, compressor instability may exist due to high Mach Numbers at the vaned diffuser inlet (e.g. vane diffuser leading edge 32a in FIG. 1B), typically during transient operation (acceleration and/or deceleration). As embodied herein, and with reference to FIG. 1A bleed openings 94 are provided in compressor housing 18 proximate each of compressor inlets 20 and 22. The configuration of openings 94 may preferably be circumferentially extending slots having an axial width depending upon the total flow area required by the particular application. However, other bleed opening configurations are possible. Additionally, openings 94 are flow connected to passage ways 96 for ducting the bleed air to or from inlets 20, 22 to the entrance to compressor casing 38 as depicted in FIG. 1A or, alternatively (not shown), the atmosphere. In particular, the depicted bleed systems are expected to help stabilize the vaned diffuser past its first stall instability. One skilled in the art given the present disclosure would understand that other bleed systems could be used, including that described in co-pending provisional application by Atte Anema entitled Adjustable Compressor Bleed System and Structure, filed concurrently herewith (Ser. No. 12/073,982, the disclosure in which is hereby incorporated by reference.

Significantly, the axial symmetry of the present dual-entry compressor rotor 14, which can operate at relatively high speeds without appreciable changes in rotor shape ("flowering"), as would be experienced by conventional single-entry centrifugal compressors at these speeds, may minimize or even eliminate the need for conventional abradeable coatings to maintain running clearance between the impeller blades and the inner wall surface of the compressor housing. This configuration also eliminates the friction loss on the back wall of the impeller that occurs in single entry centrifugal compressors. Moreover, elimination of a second, separate centrifugal compressor stage, and the use of a two bearing assembly shaft support configuration may provide an axially compact gas generator having an L/D ratio of only about 1.25:1 (see FIG. 1A).

Based on the foregoing disclosure, various specific gas turbine gas generator applications are possible using the relatively simple, and therefore more robust, combination of a single stage dual-entry compressor and an inflow radial turbine mounted on a single shaft assembly. For example, as presently contemplated, a gas generator such as depicted in FIG. 1A may operate with a pressure ratio of about 12:1, and produce an equivalent shaft power of about 1275 Mw at about 50,000 rpm with about a 5 kg/sec air flow, a turbine inlet temperature of about 100° C., and a turbine expansion ratio of about 4:1. Turbine tip rotor speed would be approximately 700 m/sec, with a maximum rotor tip temperature of about 850° C. for this example.

Moreover, combining such a high pressure ratio, high efficiency (about 80%) compressor with a very efficient radial turbine (about 90%) without the need for turbine blade and turbine inlet vane cooling may provide overall engine thermal efficiency of about 30% or greater for engines less than about 4 Mw, more particularly between about 1 Mw to about 3 Mw, a performance usually found in axial flow machines three times that size.

It will be apparent to those skilled in the art that various modifications and variations could be made in the gas turbine gas generator apparatus of the present invention without departing from the scope or the spirit of the invention. Furthermore, it is intended that the disclosed invention not be limited by the foregoing examples, but only by the following claims and equivalents.

What is claimed is:

1. A high performance gas turbine gas generator comprising:
   a rotatable shaft defining an axial direction and a radial direction;
   a single compressor stage comprising a dual-entry high pressure ratio centrifugal compressor having a housing and a bladed impeller mounted on the shaft and defining with the housing a pair of opposed axially directed inlets and a single radially directed outlet;
   a combustor assembly operatively connected to receive compressed air from the centrifugal compressor outlet and configured for combusting fuel with the compressed air to produce combustion gases;
   a radial inflow turbine mounted on the shaft and operatively connected to receive combustion gases from the combustor assembly through a radially directed inlet and configured to partially expand the received combustion gases to drive the centrifugal compressor, the radial inflow turbine also configured to direct the partially expanded combustion gases through a generally axially directed turbine outlet,
   wherein the shaft is rotatably supported by a pair of bearing assemblies positioned at opposed axial ends of the centrifugal compressor,
   wherein the radial inflow turbine is mounted on a cantilevered portion of the shaft extending axially outboard of one of the bearing assemblies,
   wherein the centrifugal compressor inlets are further configured to provide, at a rated mass flow and speed (RPM), a maximum compressor inlet Mach Number of about 1.4 or less, and
   wherein the centrifugal compressor is further configured to provide at the rated speed and mass flow, a pressure ratio of about 12:1 or greater.

2. The gas generator of claim 1, wherein an expansion ratio across the radial inflow turbine is about 4:1 to about 5:1.

3. The gas generator as in claim 1, further including a bleed system for bleeding air through the compressor housing at locations adjacent each of the compressor inlets.

4. The gas turbine gas generator as in claim 1, wherein the combustor assembly includes a plurality of can combustors.

5. The gas generator as in claim 1, wherein essentially all the compressed air from the dual-entry compressor is received by the combustor assembly.

6. The gas generator as in claim 1, wherein the centrifugal compressor is configured to resist axial deformation of the impeller at the compressor outlet.

7. The gas generator as in claim 6, wherein the centrifugal compressor includes an impeller having a hub with a single integral wall adjacent the outlet, the wall being orthogonal to the axis and mounting axially opposed respective blade sets.

8. The gas generator as in claim 7, wherein the impeller hub is configured to operate at a speed of about 50,000 rpm at an air mass flow of about 5 kg/sec.

9. A gas turbine engine including the gas generator of claim 1 and having a thermal efficiency of about 30% or greater at a rated power of about 1 Mw to about 3 Mw.

10. An improved gas turbine gas generator of the type having a single stage centrifugal compressor mounted on a shaft rotatable about an axis, the compressor supplying compressed air to a combustor section, and a radial inflow turbine mounted on the shaft and configured for partially expanding gases formed by combusting fuel with the compressed air in the combustor section to drive the compressor and for releasing the partially expanded combustion gases for further work-producing expansion, the improvement comprising:
   the single stage centrifugal compressor comprising a dual-entry high pressure ratio centrifugal compressor having a housing, and a bladed impeller mounted on the shaft within the housing, the impeller defining with the housing a pair of spaced apart axially directed opposed inlets and a single radially directed outlet,
   wherein the compressor is configured to have a maximum inlet Mach Number of less than or equal to about 1.4 at rated speed and mass flow,
   wherein the compressor is configured to provide a pressure ratio of about 12:1 or greater to about 15:1, and
   wherein the compressor further includes means for bleeding air from each of the inlets.

11. The improved gas turbine gas generator of claim 10, wherein the dual-entry centrifugal compressor is mounted between a pair of bearing assemblies positioned proximate the respective compressor inlets, and wherein the radial turbine is mounted on a cantilevered portion of the shaft outboard of one of the bearing assemblies.

12. The improved gas turbine gas generator of claim 11, wherein the bearing assembly adjacent the radial turbine comprises a radial tilt-pad bearing, and wherein the other bearing assembly comprises a ball bearing.

13. The improved gas turbine gas generator of claim 11, further including a thrust piston assembly configured to counteract axial thrust from the radial turbine.

14. The improved gas turbine gas generator as in claim 10, having an L/D ratio of about 1.25:1.

15. The improved gas turbine gas generator as in claim 10, further including
   an annular diffuser for diffusing compressed air received from the compressor outlet,
   a collector having plurality of scroll-shaped sector portions for collecting the diffused compressed air from the diffuser, and
   a like plurality of crossover ducts each connected to a respective scroll-shaped sector portion for channeling the collected diffused compressed air to the combustor section.

16. The improved gas turbine gas generator as in claim 15, wherein three collector scroll-shaped sector portions and three crossover ducts are provided.

17. The improved gas turbine gas generator as in claim 15, wherein the combustor includes a like plurality of can combustors angularly distributed about the axis and positioned between the crossover ducts.

18. The improved gas turbine gas generator as in claim 16, further including a compressor inlet casing for admitting air to both of the compressor inlets, wherein the inlet casing is positioned between two of the three angularly spaced crossover ducts.

19. A gas turbine engine including the gas turbine gas generator of claim 10 and a free-power turbine module configured to receive the partially expanded combustion gases from the gas generator.

20. A gas turbine engine including the gas turbine gas generator of claim 10 and propulsion nozzle apparatus configured to receive the partially expanded combustion gases from the gas generator.

* * * * *

UNITED STATES PATENT AND TRADEMARK OFFICE
CERTIFICATE OF CORRECTION

PATENT NO. : 7,628,018 B2 Page 1 of 1
APPLICATION NO. : 12/073980
DATED : December 8, 2009
INVENTOR(S) : R. Jan Mowill It is certified that error appears in the above-identified patent and that said Letters Patent is hereby corrected as shown below:

Title Page, Item (54) and at Column 1, lines 1-3, title should read
SINGLE STAGE DUAL-ENTRY <u>CENTRIFUGAL</u> COMPRESSOR, RADIAL TURBINE GAS GENERATOR

Signed and Sealed this

Twenty-sixth Day of January, 2010

David J. Kappos
*Director of the United States Patent and Trademark Office*